United States Patent [19]

Brokenshire

[11] Patent Number: 4,875,034
[45] Date of Patent: Oct. 17, 1989

[54] STEREOSCOPIC GRAPHICS DISPLAY SYSTEM WITH MULTIPLE WINDOWS FOR DISPLAYING MULTIPLE IMAGES

[76] Inventor: Daniel A. Brokenshire, 3413 SW. Dickinson St., Portland, Oreg. 97219

[21] Appl. No.: 153,116

[22] Filed: Feb. 8, 1988

[51] Int. Cl.⁴ .............................................. G09G 1/06
[52] U.S. Cl. ................................... 340/721; 340/723; 358/3; 358/88; 364/522
[58] Field of Search ............... 340/728, 729, 721, 723; 358/3, 88, 89, 90, 91, 92; 364/522; 350/130, 132

[56] References Cited

U.S. PATENT DOCUMENTS

| | | | |
|---|---|---|---|
| 4,550,315 | 10/1985 | Bass et al. | 340/729 |
| 4,567,513 | 1/1986 | Imsand | 358/92 |
| 4,719,507 | 1/1988 | Bos | 358/88 |
| 4,754,327 | 6/1988 | Lippert | 358/88 |
| 4,757,380 | 7/1988 | Smets et al. | 358/88 |
| 4,808,979 | 2/1989 | DeHoff et al. | 358/88 |

Primary Examiner—Gerald Brigance
Assistant Examiner—Richard Hjerpe
Attorney, Agent, or Firm—Mark M. Meininger; Robert S. Hulse

[57] ABSTRACT

A stereoscopic graphics display system (10) has a stereoscopic window controller (18) that generates multiple windows (72 and 74) within which multiple images (76 and 78) are formed. The stereoscopic window controller directs the graphics display system to render around each window a border (80 and 82) representing an outline of the window. Each of the borders is rendered with zero binocular disparity to assist an observer to perceive the three-dimensional qualities of stereoscopic images. Depth cue contradictions between stacked windows are reduced by rendering with zero binocular disparity the images in occluded windows.

8 Claims, 2 Drawing Sheets

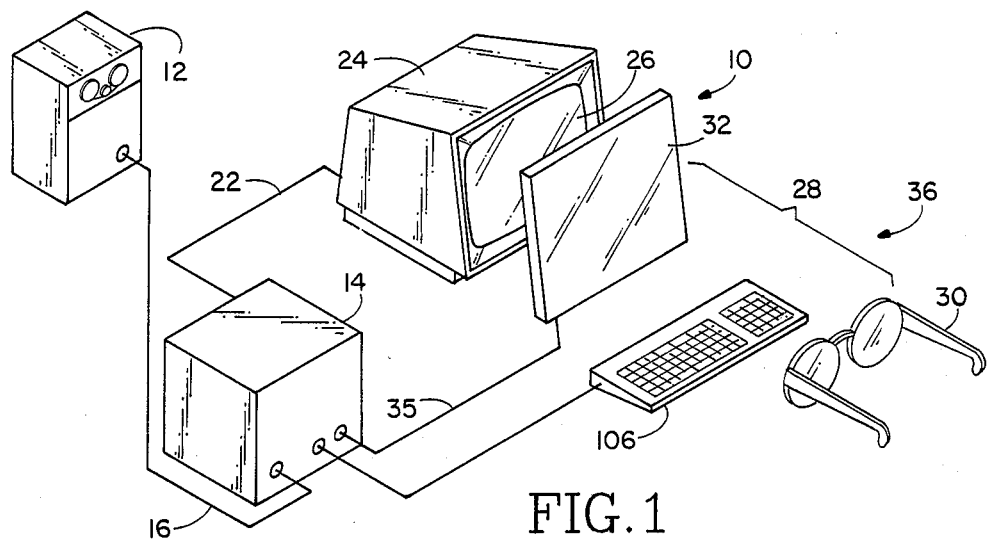
FIG. 1
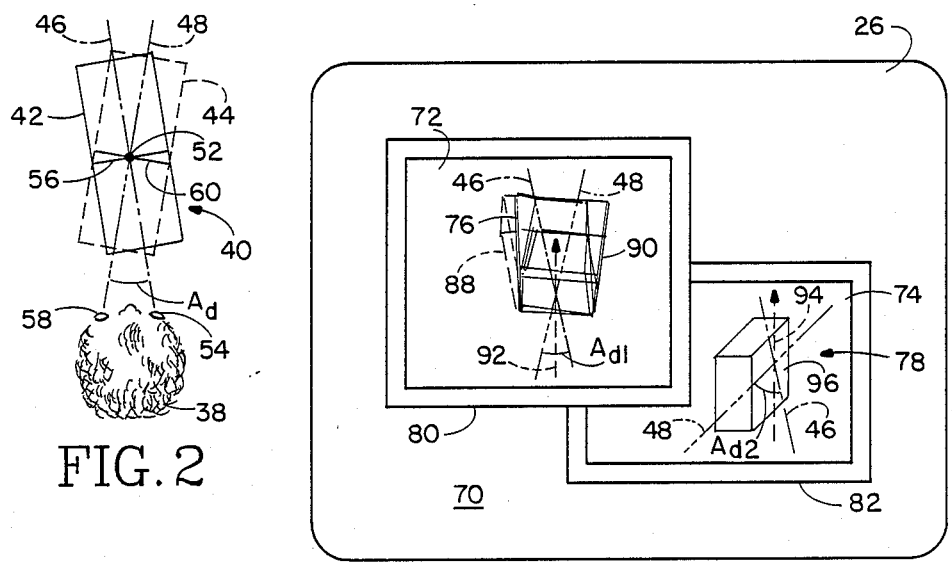
FIG. 2
FIG. 3

STEREOSCOPIC GRAPHICS DISPLAY SYSTEM WITH MULTIPLE WINDOWS FOR DISPLAYING MULTIPLE IMAGES

TECHNICAL FIELD

The present invention relates to stereoscopic graphics display systems and, in particular, to such systems that employ multiple windows to display multiple images.

BACKGROUND OF THE INVENTION

A stereoscopic graphics display system forms on a display screen stereoscopic images that appear to have three-dimensional qualities. Such display systems can be used advantageously in association with, for example, mechanical engineering computer-aided design systems.

A stereoscopic image of an object includes a right-eye view of the object and a left-eye view of the object. The right- and left-eye views are rendered on a two-dimensional display screen and are directed to an observer's right and left eyes, respectively. The right- and left-eye views differ by a preselected amount of binocular disparity that is defined by a binocular viewing model. The binocular disparity allows the observer to perceive from the right- and left-eye views the three-dimensional qualities of the stereoscopic image.

The binocular viewing model defines a three-dimensional viewing volume within which the stereoscopic images rendered on the display screen of the stereoscopic graphics display system appear to lie. In a typical stereoscopic graphics display system, the viewing volume is employed as a single, continuous image space for displaying a single stereoscopic image. Although it can synthesize a stereoscopic image that includes image components representing several objects, such a system requires the use of relatively complex mathematical models to synthesize such multiple component stereoscopic images. The complexity of the mathematical models representing multiple component stereoscopic images causes them to be rendered relatively slowly and requires that they be re-rendered when only one image component is changed. As a result, a change in even one of the image components is also a relatively slow process.

Furthermore, in such systems all of the image components are typically rendered in accordance with the same binocular viewing model and, therefore, have the same depth characteristics. It is often useful, however, to view different stereoscopic images in accordance with different binocular viewing models.

Certain conventional text-based systems and two-dimensional graphics display systems are capable of displaying multiple images. Such systems employ a "windowed" environment in which the display screen of the system is divided into multiple two-dimensional windows that contain multiple images. The windowed environments of text-based and two-dimensional graphics display systems have, however, been difficult to implement in a stereoscopic graphics display system.

A first difficulty stems from the fact that images rendered by a stereoscopic graphics display system have depth characteristics. The abovedescribed text-based and two-dimensional systems typically allow windows to be "stacked" so that a preferred window can overlap and occlude another window on the display screen. In the stacking of windows, the preferred window typically appears to be positioned in front of the other window.

In a stereoscopic graphics display system, however, the image in the preferred window could appear to lie at a first location that is behind a second location at which the image in the other window appears to lie. Under such circumstances, an observer could perceive depth cue contradictions between the two windows such that the preferred window appears to be positioned in front of the other window but that the image in the preferred window appears to be positioned behind the image in the other window. Depth cue contradictions can cause the observer to experience eye fatigue or discomfort.

A second difficulty stems from the fact that different stereoscopic images are often rendered in accordance with different binocular viewing models that provide the images with different depth characteristics. A windowed environment in a stereoscopic graphics display system should, therefore, be adapted to provide different windows with different binocular viewing models. This differs from the rendering of the images and the windows of text-based and two-dimensional graphics systems, which are defined within the plane of the display screen.

SUMMARY OF THE INVENTION

An object of this invention is, therefore, to provide a stereoscopic graphics display system that is capable of providing multiple windows for displaying multiple images.

Another object of this invention is to provide such a system that can reduce depth cue contradictions among different ones of the multiple windows.

A further object of this invention is to provide such a system in which different windows can be assigned different binocular viewing models.

The present invention is a stereoscopic graphics display system having a stereoscopic window controller that generates on a display screen multiple windows within which multiple images are formed. In a preferred embodiment, the stereoscopic window controller designates for each one of the multiple windows a corresponding region of the display screen. Each one of the multiple windows is assigned a binocular viewing model that defines a preselected amount of binocular disparity.

Stereoscopic images that include right- and left-eye views are rendered on the display screen within the regions corresponding to the windows. Each of the images is rendered in accordance with the binocular viewing model of the window within which the image appears. Each of the windows is outlined by a border that is rendered with zero binocular disparity. Such borders assist an observer to perceive a single stereoscopic image from the right- and left-eye views that form the image.

The regions designated for different ones of the multiple windows can partly or completely intersect one another, thereby resulting in overlapping or "stacked" windows. Under such circumstances, each one of the intersecting windows is assigned a display priority relative to the other intersecting windows. Windows having higher display priorities are displayed preferentially over (i.e., so that they occlude) windows having lower display priorities.

To reduce depth cue contradictions, only the image in the window of highest display priority can be rendered in accordance with a binocular viewing model having non-zero binocular disparity. The images within partly occluded windows are temporarily assigned a binocular viewing model having zero binocular disparity. The images in the partly occluded windows appear, therefore, to be in the same plane as that of the borders of the windows.

In an alternative method of reducing depth cue contradictions, occluded windows are assigned a binocular viewing model having positive binocular disparity. The images in the occluded volume elements appear, therefore, to be positioned behind the plane in which the borders of the windows appear to be positioned.

Additional objects and advantages of the present invention will be apparent from the following detailed description of preferred embodiments thereof, which proceeds with reference to the accompanying drawings.

BRIEF DESCRIPTION OF THE DRAWINGS

FIG. 1 is a diagram of a stereoscopic graphics display system of the present invention in direct data communication with a host computer.

FIG. 2 is a plan view of a schematic representation of an observer viewing a stereoscopic viewing volume.

FIG. 3 shows an exemplary display of two stacked windows rendered in accordance with this invention.

DETAILED DESCRIPTION OF PREFERRED EMBODIMENTS

FIG. 1 is a diagrammatic representation of a stereoscopic graphics display system 10 in direct data communication with a main or host computer 12. Display system 10 includes a system controller unit 14 that receives image data delivered through a communication means or port 16 from host computer 12. The image data are generated by an application program such as, for example, a mechanical engineering computer-aided design program that resides in host computer 12.

Figure 4:
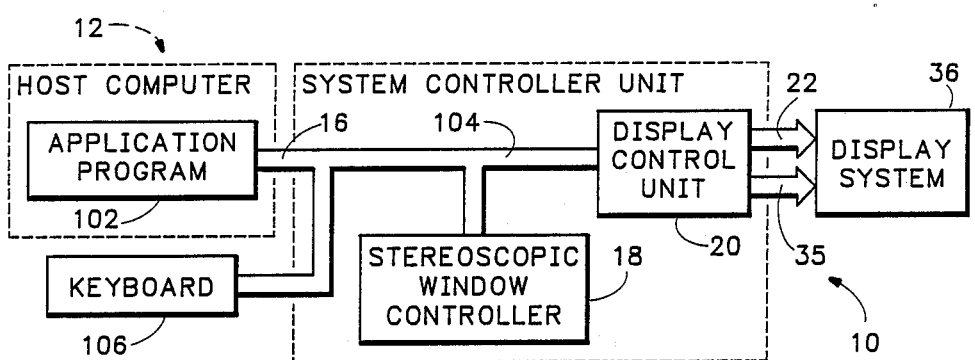
FIG. 4 is a simplified block diagram showing a stereoscopic window controller incorporated into a graphics display system in direct data communication with a host computer as shown in FIG. 1.

System controller unit 14 includes a stereoscopic window controlling means or controller 18 (FIG. 4) and a display control unit 20 (FIG. 4). Controller 18 and display control unit 20 cooperate to provide on a display data link 22 control signals that direct a cathode-ray tube 24 to form on its display screen 26 one or more windows within which are rendered one or more graphics display images that correspond to the image data.

The image data delivered from host computer 12 may be either stereoscopic image data or three-dimensional image data. Three-dimensional image data correspond to a three-dimensional representation of a physical object. Such data are used for rendering on a two-dimensional display screen an image representing a one-eyed, three-dimensional view of the object.

If it were configured to receive three-dimensional image data, system controller unit 14 would include an image data processor (not shown) for transforming the three-dimensional image data into stereoscopic image data. One such suitable processor is described in copending U.S. patent application Ser. No. 07/121,188 of Brokenshire et al., filed Nov. 11, 1987, for Stereoscopic Graphics Display Terminal With Image Data Processing. For purposes of simplicity, host computer 12 will be described as delivering stereoscopic image data to system controller unit 14.

Stereoscopic image data correspond to right-and left-eye views of an object, which views are formed on display screen 26 and are directed by a stereoscopic switch unit 28 toward an observer's right and left eyes, respectively. The right- and left-eye views comprise a stereoscopic image of the object, which image allows the observer to perceive the three-dimensional qualities of the object. The stereoscopic image can employ perspective or isometric views and can include hidden-line removal, shading, or other cues to assist an observer to visualize the three-dimensional properties of the object.

U.S. Pat. No. 4,719,507 of Bos, issued Jan. 12, 1988, for Stereoscopic Imaging System With Passive Viewing Apparatus describes the construction and operation of one suitable stereoscopic switch unit 28, which includes a set of polarized eyeglasses 30 and a liquid crystal encoder module 32 that receives control signals from an output 35 of system controller unit 14.

Encoder 32 separately encodes alternate light images on display screen 26 of cathode-ray tube 24 in right- and left-circularly polarized light. The alternate light images correspond to the right- and left-eye views of the object. Polarized eye glasses 30 include right and left lenses which transmit, respectively, the right- and left-circularly polarized light, thereby transmitting the right-eye view of the object to the observer's right eye and the left-eye view of the object to the observer's left eye. Cathode-ray tube 24, liquid crystal encoder module 32, and eyeglasses 30 comprise a display means or system 36.

FIG. 2 is a plan view of an observer 38 viewing a stereoscopic viewing volume 40. Viewing volume 40 comprises three-dimensional right- and left-eye viewing spaces 42 and 44, respectively, in which a stereoscopic representation of an object is depicted. Viewing volume 40 and viewing spaces 42 and 44 each have a third dimension that extends into the plane of the page. Viewing spaces 42 and 44 are aligned with respective lines-of-sight 46 and 48, which are separated by a binocular disparity angle $A_d$. The disparity angle $A_d$ corresponds to a rotational displacement about a vertical axis 52 of viewing space 42 relative to viewing space 44. Preferably, viewing spaces 42 and 44 are rotated in opposite directions about axis 52 by an amount $|A_d/2|$ to form the disparity angle $A_d$.

The observer's right eye 54 views a two-dimensional right-eye view plane 56 in which a three-dimensional representation of a right-eye view of the object is formed with perspective, hidden-line removal, shading, or other visual cues to depict depth. Similarly, the observer's left eye 58 views a two-dimensional left-eye view plane 60 in which a similar three-dimensional representation of a left-eye view of the object is formed. View planes 56 and 60 typically correspond to the plane of display screen 26 upon which the right- and left-eye views of the object are alternately formed. Differences between the right- and left-eye views of the object correspond to binocular disparity that allows the observer to perceive depth in the stereoscopic image of the object.

FIG. 3 shows an exemplary display 70 rendered on display screen 26 of cathode-ray tube 24. Display 70 includes a first window 72 and a second window 74 within which are rendered a first graphics display image 76 and a second graphics display image 78, respectively. Each one of images 76 and 78 can be independently manipulated without affecting the other one of the images. As a result, a manipulated image can be rendered relatively quickly.

Windows 72 and 74 are outlined by respective window borders 80 and 82. Windows 72 and 74 are positioned such that they appear to be "stacked", with first window 72 being positioned over and partly occluding second window 74. Display 70 is synthesized into a stereoscopic image by means of stereoscopic switch unit 28. It will be appreciated that in a different display, windows could be positioned on display screen 26 so that the windows would not appear to be stacked.

Image 76 within window 72 represents a box having vertical height as its shortest dimension and depth into the plane of the page as the longest dimension of the box. Image 76 includes a right-eye view 88 and a left-eye view 90 that are generated by rotating the views about a vertical axis 92 that is in the plane of the page. Right-eye view 88 is drawn with broken lines for purposes of clarity. In operation, both right-eye view 88 and left-eye view 90 would be rendered with solid lines on display screen 26.

The views are rotated in opposite directions about axis 92 by an amount $|A_{d1}/2|$ to form between the views a disparity angle $A_{d1}$. The location of axis 92 and the magnitude of the disparity angle $A_{d1}$ comprise a binocular viewing model that is particular to window 72. The binocular viewing model provides image 76 with positive binocular disparity so that the image appears to be behind display screen 26. It will be appreciated that views 88 and 90 can be generated by means of a shear or by employing two centers of projection.

Border 80 of window 72 is rendered with zero binocular disparity and appears to be in the plane of display screen 26. The right- and left-eye views of border 80 are the same because they have zero binocular disparity. Border 80 provides, therefore, right-eye view 88 and left-eye view 90 with common features that assist an observer to fuse the two views into the single stereoscopic image 76.

Window 74 also has a particular binocular viewing model that includes an axis 94 and a non-zero disparity angle $A_{d2}$ for forming stereoscopic images. The binocular viewing model of window 74 would provide image 78 with negative binocular disparity so that the image would appear to be in front of display screen 26. Image 78 is rendered, however, with zero binocular disparity and includes only a single view 96, as described below in greater detail.

Border 82 of window 74 is rendered with zero binocular disparity and appears to be in the plane of display screen 26. Window 82 appears, therefore, to be in the same plane as that of border 80 of window 72. Borders 80 and 82 are shown as pairs of parallel lines outlining windows 72 and 74, respectively. Borders 80 and 82 could be alternatively rendered as single lines.

The positive and negative binocular disparities of windows 72 and 74, respectively, together with the stacking of the windows, could cause an observer to perceive depth cue contradictions between the windows. In particular, window 72 is stacked on, and appears to be in front of, window 74. In accordance with the binocular viewing model of window 72, image 76 appears to be behind display screen 26 and borders 80 and 82. If image 78 were rendered in accordance with the binocular viewing model of window 74, image 78 would appear to be in front of display screen 26 and borders 80 and 82. Such an appearance would provide an observer with contradictory depth cues because window 74 would appear to be positioned behind window 72, but image 78 would appear to be positioned in front of window 80.

Depth cue contradictions are reduced, therefore, by rendering with zero binocular disparity the images in occluded windows such as window 74. Alternatively, depth cue contradictions can be reduced by rendering with positive binocular disparity the images in occluded windows. The images in occluded windows could, therefore, appear to be in the plane of or behind display screen 26. Such an appearance would be consistent with the relative stacking of the windows.

It will be appreciated that multiple stereoscopic images can be simultaneously rendered in accordance with the binocular viewing models of multiple nonintersecting windows. Such windows do not present the depth cue contradictions that stacked, intersecting windows present. Such windows allow, therefore, the simultaneous display stereoscopic images of multiple objects or stereoscopic images of multiple views of a single object.

FIG. 4 is a block diagram showing system controller unit 14 in direct data communication with host computer 12. An application program 102 residing in host computer 12 generates stereoscopic image data representing, for example, images 76 and 78 (FIG. 3). The stereoscopic image data are defined by a set of coordinates corresponding to viewing volume 40 (FIG. 2).

The stereoscopic image data are directed along a data transfer bus 104 to display control unit 20, which generates signals for controlling image display system 36. In particular, control circuit 20 generates control signals for cathode-ray tube 24 (FIG. 1) and encoder module 32 (FIG. 1), the signals being simultaneously provided to data transfer bus 22 and output 35 of system controller unit 14, respectively, for alternately displaying the right-and left-eye views of the object. An observer wearing eyeglasses 30 is thereby provided with a stereoscopic image representing the object.

Stereoscopic window controller 18 communicates with host computer 12 and display control circuit 20 via data transfer bus 104. Window controller 18 provides image information for rendering on display screen 26 windows 72 and 74 within which images 76 and 78, respectively, are formed. Windows 72 and 74 can be manipulated through a data input means such as, for example, a keyboard 106, as described below in greater detail.

Figure 5:
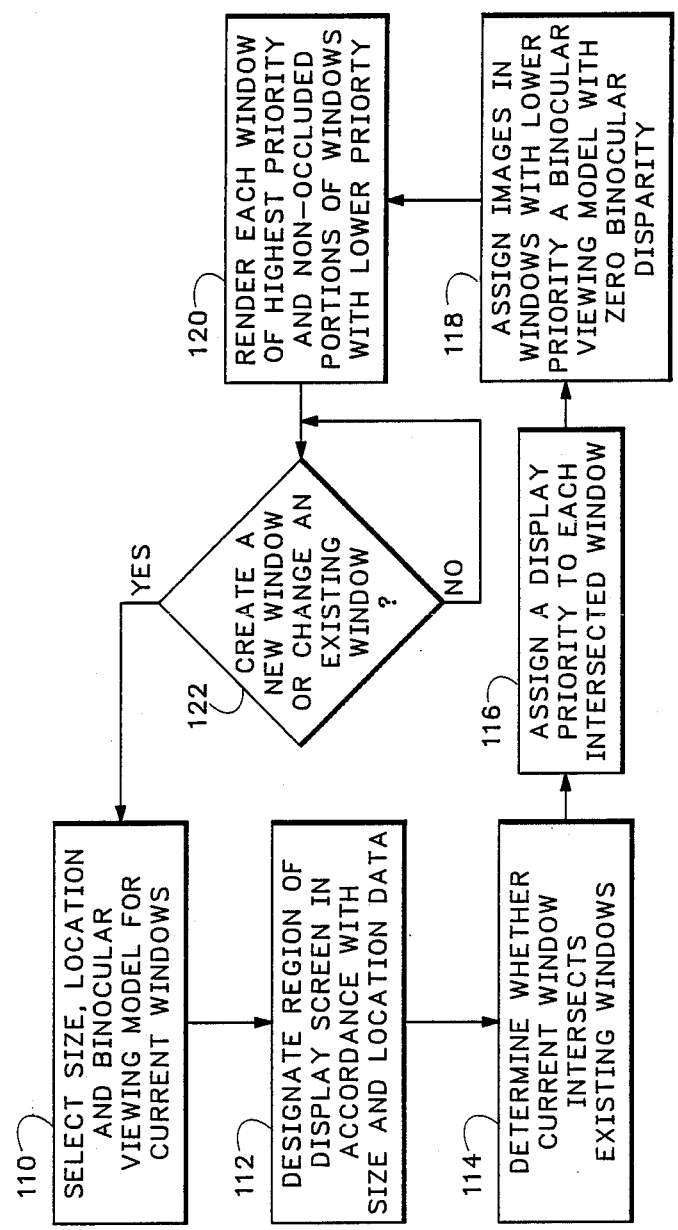
FIG. 5 is a flow diagram showing the process by which a window is generated in a stereoscopic graphics display system incorporating the controller of FIG. 4.

FIG. 5 is a flow diagram showing with reference to FIGS. 3 and 4 the process steps by which windows 72 and 74 are rendered. It will be appreciated that these process steps can be programmed into and performed by a computer or microprocessor or, alternatively, be performed by a dedicated electronic circuit.

Process block 110 indicates that for a window currently being manipulated ("current window") such as, for example, window 72, data relating to the size and location of the window on display screen 26 are selected. Data relating to the binocular viewing model for the window are also selected. An observer using display system 10 can select the size and location of a current window by entering size and location commands, respectively, via keyboard 106 into window controller. Similarly, the observer can enter commands relating to the binocular viewing model. Whenever the observer does not select the size and location of a current window, window controller 18 employs predetermined default values for the data.

Process block 112 indicates that window controller 18 designates a region of display screen 26 as corresponding to current window 72. The region is designated in accordance with the size and location data for current window 72 and includes a peripheral portion within which border 80 is to be formed.

Process block 114 indicates that window controller 18 determines whether the region of the current window 72 intersects the region of any other windows such as, for example, window 74. Intersections are identified, for example, by performing in a pixel-by-pixel fashion a logic AND operation between the region of current window 72 and the region of other window 74. Intersections between the regions of different windows represent a stacking of the different windows. For purposes of simplicity, intersections between the regions of different windows are also referred to as intersections between the windows.

Process block 116 indicates that each of the intersected windows is assigned a display priority. The display priority defines the location of a window within a stack of intersecting windows. In particular, the display priority provides a means for determining which ones of a number of intersecting windows are visible. Whenever different windows intersect, windows of higher display priority occlude windows of lower display priority. In display 70, window 72 has a higher display priority than that of window 74. It will be appreciated that multiple windows that do not intersect each other can be assigned the same display priority.

Process block 118 indicates that images within windows of lower priority are assigned binocular viewing models with zero binocular disparity, thereby to eliminate depth cue contradictions between the windows.

Process block 120 indicates that window controller 18 provides display control unit 20 with image data corresponding to display 70. In particular, window controller 18 provides display control unit 20 with information for rendering each window of highest display priority and the nonoccluded portions of the windows with lower display priorities. The information relating to the borders of the windows includes binocular viewing models that allow the borders to be rendered with zero binocular disparity.

Decision block 122 represents an inquiry as to whether an existing window is to be changed or a new window is to be created. If an existing window is to be changed or a new window is to be created, decision block 122 proceeds to process block 110, and the window to be changed or the new window becomes the current window. If an existing window is not to be changed or a new window is not to be created, decision block 122 awaits a window request.

The process described in FIG. 5 allows a user to perform in a stereoscopic graphics display system 10 window manipulations that are typically available in a windowed environment. For example, windows may be created or deleted, moved to different parts of the display screen, have their sizes increased or decreased, be completely occluded by other windows, or completely occlude other windows.

Figure 6:
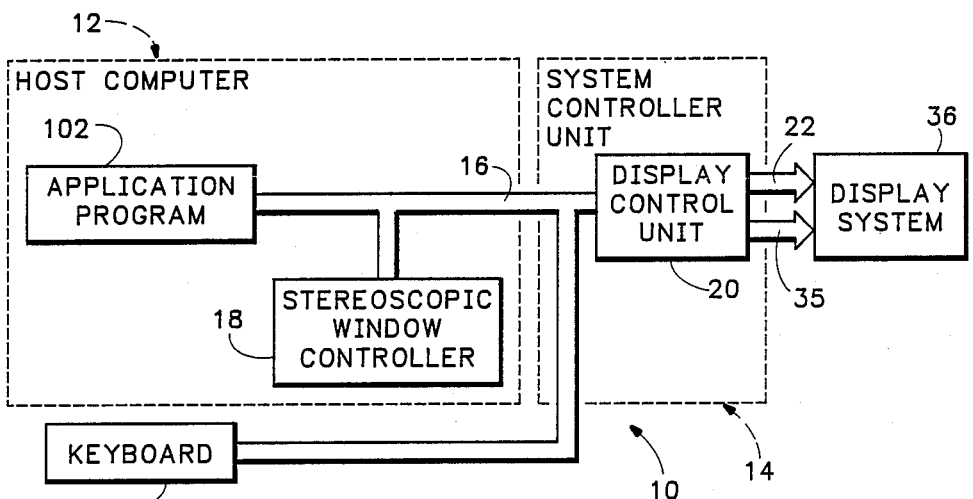
FIG. 6 is a simplified block diagram showing a stereoscopic window controller incorporated into a host computer in direct data communication with a stereoscopic graphics display system as shown in FIG. 1.

FIG. 6 is a block diagram showing an alternative preferred embodiment for employing stereoscopic window controller 18 with graphics display system 10. In particular, window controller 18 is in the form of a computer program that resides in host computer 12 and is in data communication with application program 102. Image data corresponding to images and windows are directed over communication port 16 to display control unit 20 within system controller unit 14. Display control unit 14 generates control signals for controlling image display system 36. The embodiments of FIGS. 4 and 6 provide by similar processes a windowed environment for stereoscopic graphics display systems.

It will be obvious to those having skill in the art that many changes may be made to the details of the above-described preferred embodiments of the present invention without departing from the underlying principles thereof. For example, in addition to generating windows for the display of stereoscopic images, stereoscopic graphics display system 10 could also generate windows within which are displayed text, two-dimensional graphics images, and monocular three-dimensional graphics images. Windows for such stereoscopic images are, therefore, assigned binocular viewing models with zero binocular disparity. The scope of the present invention should be determined, therefore, only by the following claims.

I claim:

1. In a stereoscopic graphics display system having a display screen upon which an image is formed in accordance with stereoscopic image data representing right- and left-eye views differing by a preselected amount of binocular disparity that is established by a binocular viewing model, a method of forming on the display screen plural windows within which plural images are formed, comprising:
   designating for each one of the windows a corresponding region of the display screen, each region including a marginal peripheral portion;
   assigning to each window a first binocular viewing model by which images are rendered within the region corresponding to the window and a second binocular viewing model by which a border is rendered with zero binocular disparity within the marginal peripheral portion; and
   rendering within the marginal peripheral portions of the regions borders that represent outlines of the corresponding windows,
   whereby each border is rendered with zero disparity and the stereoscopic graphics display system is capable of rendering the right- and left-eye views of a stereoscopic image within each of the plural windows in accordance with the first binocular viewing model assigned to the window.

2. The method of claim 1, further comprising:
   detecting each region that corresponds to multiple ones of the window;
   assigning a display priority to each one of the windows to which the detected region corresponds, the display priorities ranging from a highest display priority to a lowest display priority; and
   rendering about each detected region the border of the window that has a higher display priority than the display priority of any other window to which the region corresponds, thereby occluding in the region each window of lower display priority.

3. The method of claim 2 in which a window of lower display priority is occluded by a window of higher display priority, the method further comprising assigning to the window of lower display priority a binocular viewing model having zero binocular disparity, thereby to reduce depth cue contradictions between the windows of higher and lower display priorities.

4. The method of claim 2 in which a window of lower display priority is occluded by window of higher display priority and in which the binocular viewing models are capable of establishing either negative binocular disparity or positive binocular disparity so that images appear to be, respectively, in front of or behind the display screen, the method further comprising assigning the window of lower display priority a binocular viewing model having positive binocular disparity, thereby to reduce depth cue contradictions between the windows of higher and lower display priorities.

5. A stereoscopic graphics display system, comprising:
   a display screen upon which an image is formed in accordance with stereoscopic image data representing right- and left- eye views of an object, the right- and left- eye views differing by a preselected amount of binocular disparity that is established by a binocular viewing model; and
   display system controlling means for forming on the display screen plural windows in corresponding display screen regions that include marginal peripheral portions and for rendering borders defining the marginal peripheral portions in accordance with binocular viewing models with zero disparity and images within the windows in accordance with binocular viewing models assigned to the windows,
   whereby the stereoscopic graphics display system is capable of rendering the right- and left eye views of an object within each of the plural windows in accordance with the binocular viewing model assigned to the window.

6. The system of claim 5 in which the display system controlling means further comprises:
   stereoscopic window control means for detecting each region that corresponds to multiple ones of the windows and assigning a display priority to each one of the windows to which the detected region corresponds, the display priorities ranging from a highest display priority to a lowest display priority; and
   display control means for directing the display system to render about each detected region the border of the window that has a higher display priority than the display priority of any other window to which the region corresponds, thereby occluding in the region each window of lower display priority.

7. The system of claim 6 in which a window of lower display priority is occluded by a window of higher display priority, the stereoscopic window controlling means further comprising means for assigning to the window of lower display priority a binocular viewing model having zero binocular disparity, thereby to reduce depth cue contradictions between the windows of higher and lower display priorities.

8. The system of claim 6 in which a window of lower display priority is occluded by window of higher display priority and in which the binocular viewing models are capable of establishing either negative binocular disparity or positive binocular disparity so that images appear to be, respectively, in front of or behind the display screen, the stereoscopic window controlling means further comprising means for assigning the window of lower display priority a binocular viewing model having positive binocular disparity, thereby reduce depth cue contradictions between the windows of higher and lower display priorities.

* * * * *